US012718767B2

(12) United States Patent
Kim et al.

(10) Patent No.: US 12,718,767 B2
(45) Date of Patent: Aug. 25, 2026

(54) GATE DRIVER AND DISPLAY DEVICE INCLUDING THE SAME

(71) Applicant: Samsung Display Co., Ltd., Yongin-Si (KR)

(72) Inventors: Minjoo Kim, Yongin-si (KR); Minwoo Byun, Yongin-si (KR); Ji-Hyun Ka, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/928,223

(22) Filed: Oct. 28, 2024

(65) Prior Publication Data

US 2025/0157410 A1 May 15, 2025

(30) Foreign Application Priority Data

Nov. 9, 2023 (KR) ........................ 10-2023-0154890

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0852* (2013.01); *G09G 2300/0861* (2013.01); *G09G 2310/08* (2013.01); *G09G 2320/0233* (2013.01); *G09G 2330/021* (2013.01)

(58) Field of Classification Search
CPC ...... G09G 3/32; G09G 3/3233; G09G 3/3266; G09G 2300/0426; G09G 2300/0852; G09G 2300/0861; G09G 2310/0267; G09G 2310/08; G09G 2320/02; G09G 2330/021
See application file for complete search history.

(56) References Cited

U.S. PATENT DOCUMENTS 8,766,265 B2 7/2014 Lee et al.
2018/0315369 A1* 11/2018 Pyun .................... G09G 3/3677
2022/0036802 A1* 2/2022 Kim ...................... G09G 3/3266
2022/0343857 A1* 10/2022 Choi ..................... G09G 3/3266
2024/0290264 A1* 8/2024 Park ..................... G09G 3/3233

FOREIGN PATENT DOCUMENTS

KR 10-1837625 B1 3/2018

* cited by examiner

*Primary Examiner* — Nelson M Rosario
(74) *Attorney, Agent, or Firm* — Innovation Counsel LLP

(57) ABSTRACT

A gate driver comprises a plurality of stages. Each of the stages includes a writing selection circuit configured to apply a writing selection signal to a first inversion control node based on the writing selection signal in a writing period, a holding selection circuit configured to apply a holding selection signal to a second inversion control node based on the holding selection signal in a holding period, and a gate output circuit configured to output a first low gate voltage as a low gate voltage in response to a voltage of the first inversion control node in the writing period, and output a second low gate voltage that is different from the first low gate voltage as the low gate voltage in response to a voltage of the second inversion control node in the holding period.

20 Claims, 9 Drawing Sheets

GATE DRIVER AND DISPLAY DEVICE INCLUDING THE SAME

This application claims priority under 35 USC § 119 to Korean Patent Application No. 10-2023-0154890 filed on Nov. 9, 2023, in the Korean Intellectual Property Office (KIPO), the entire disclosure of which is incorporated by reference herein.

BACKGROUND

1. Field

Embodiments of the present inventive concept relates to a gate driver and a display device including the same. More particularly, the present inventive concept relates to a gate driver and a display device including the same for improving a display quality in a variable frequency driving.

2. Description of the Related Art

Generally, a display device may include a display panel and a display panel driver. The display panel may include gate lines, data lines, emission lines, and pixels. The display panel driver may include a gate driver for providing gate signals to the gate lines, a data driver for providing a data voltage to the data lines, an emission driver for providing emission signals to the emission lines, and a driving controller for controlling the gate driver, the data driver, and the emission driver.

In a display device supporting variable frequency driving, a frame period for the display device may include a writing period in which a data voltage is written to a pixel and a holding period in which only emission of a light is performed without writing the data voltage to the pixel.

The pixel may include a driving transistor, and a luminance of a display panel may be determined based on a voltage of a gate electrode of the driving transistor. Therefore, the voltage of the gate electrode of the driving transistor must be constant during the frame period. However, due to a parasitic capacitor between the gate electrode of the driving transistor and a gate line, the voltage of the gate electrode of the driving transistor in the writing period and the holding period may be fluctuated. Accordingly, a luminance deviation of the display panel may occur in the writing period and the holding period.

SUMMARY

Embodiments of the present inventive concept provide a gate driver for reducing a luminance deviation of a display panel in a writing period and a holding period.

Embodiments of the present inventive concept provide a display device including the gate driver.

In an embodiment of a gate driver according to the present inventive concept, the gate driver may include a plurality of stages. Each of the stages may include a writing selection circuit configured to apply a writing selection signal to a first inversion control node based on the writing selection signal in a writing period, a holding selection circuit configured to apply a holding selection signal to a second inversion control node based on the holding selection signal in a holding period, and a gate output circuit configured to output a first low gate voltage as a low gate voltage in response to a voltage of the first inversion control node in the writing period, and output a second low gate voltage that is different from the first low gate voltage as the low gate voltage in response to a voltage of the second inversion control node in the holding period.

In an embodiment, each of the writing selection signal and the holding selection signal may have alternating high and low level voltages.

In an embodiment, in the writing period, the writing selection signal may have the high level voltage and the holding selection signal may have the low level voltage, and, in the holding period, the writing selection signal may have the low level voltage and the holding selection signal has the high level voltage.

In an embodiment, the second low gate voltage may be lower than the first low gate voltage.

In an embodiment, all transistors included in each of the stages may be N-type transistors.

In an embodiment, the gate output circuit may include a ninth transistor including a gate electrode electrically connected to a control node, a first electrode, and a second electrode connected to a gate output node through which a gate signal is output, a 10th transistor including a gate electrode connected to the first inversion control node, a first electrode configured to receive the first low gate voltage, and a second electrode connected to the gate output node, an 11th transistor including a gate electrode connected to the second inversion control node, a first electrode configured to receive the second low gate voltage, and a second electrode connected to the gate output node, and a second capacitor including a first electrode electrically connected to the control node and a second electrode connected to the gate output node.

In an embodiment, the writing selection circuit may include a 12th transistor including a gate electrode configured to receive the writing selection signal, a first electrode configured to receive the writing selection signal, and a second electrode, a 13th transistor including a gate electrode connected to the second electrode of the 12th transistor, a first electrode configured to receive the writing selection signal, and a second electrode, a 14th transistor including a gate electrode configured to receive a second gate clock signal, a first electrode connected to the second electrode of the 13th transistor, and a second electrode connected to the first inversion control node, a 15th transistor including a gate electrode connected to the control node, a first electrode configured to receive the first low gate voltage, and a second electrode connected to the gate electrode of the 13th transistor, and a third capacitor including a first electrode connected to the gate electrode of the 13th transistor, and a second electrode connected to the first inversion control node, and the holding selection circuit may include a 17th transistor including a gate electrode configured to receive the holding selection signal, a first electrode configured to receive the holding selection signal, and a second electrode, an 18th transistor including a gate electrode connected to the second electrode of the 17th transistor, a first electrode configured to receive the holding selection signal, and a second electrode, a 19th transistor including a gate electrode configured to receive the second gate clock signal, a first electrode connected to the second electrode of the 18th transistor, and a second electrode connected to the second inversion control node, a 20th transistor including a gate electrode connected to the control node, a first electrode configured to receive the second low gate voltage, and a second electrode connected to the gate electrode of the 18th transistor, and a fourth capacitor including a first electrode connected to the gate electrode of the 18th transistor, and a second electrode connected to the second inversion control node.

In an embodiment each of the stages may further include an input circuit configured to apply an input signal to the control node, and a carry output circuit configured to output a third low gate voltage that is different from the first low gate voltage and the second low gate voltage as a carry signal in response to the voltage of the first inversion control node or the voltage of the second inversion control node, the input circuit may include a first transistor including a gate electrode configured to receive a first gate clock signal, a first electrode configured to receive the input signal, and a second electrode connected to the control node, and the carry output circuit may include a sixth transistor including a gate electrode electrically connected to the control node, a first electrode, and a second electrode connected to a carry output node through which the carry signal is output, a seventh transistor including a gate electrode connected to the first inversion control node, a first electrode configured to receive the third low gate voltage, and a second electrode connected to the carry output node, and an eighth transistor including a gate electrode connected to the second inversion control node, a first electrode configured to receive the third low gate voltage, and a second electrode connected to the carry output node.

In an embodiment, the third low gate voltage may be lower than each of the first low gate voltage and the second low gate voltage.

In an embodiment, each of the stages may further include a first inversion control circuit configured to control the voltage of the first inversion control node based on a voltage of the control node, a second inversion control circuit configured to control the voltage of the second inversion control node based on the voltage of the control node, and a control circuit configured to control the voltage of the control node based on the voltage of the first inversion control node or the voltage of the second inversion control node, the first inversion control circuit may include a 16th transistor including a gate electrode connected to the control node, a first electrode configured to receive a third low gate voltage, and a second electrode connected to the first inversion control node, the second inversion control circuit may include a 21st transistor including a gate electrode connected to the control node, a first electrode configured to receive the third low gate voltage, and a second electrode connected to the second inversion control node, and the control circuit may include a second transistor including a gate electrode connected to the second inversion control node, a first electrode configured to receive the third low gate voltage, and a second electrode connected to the control node, and a third transistor including a gate electrode connected to the first inversion control node, a first electrode configured to receive the third low gate voltage, and a second electrode connected to the control node.

In an embodiment, each of the stages may further include a boosting circuit configured to boost a voltage of the control node, and the boosting circuit may include a fifth transistor including a gate electrode electrically connected to the control node, a first electrode configured to receive a second gate clock signal, and a second electrode, and a first capacitor including a first electrode electrically connected to the control node and a second electrode connected to the second electrode of the fifth transistor.

In an embodiment of a display device according to the present inventive concept, the display device may include a display panel including a plurality of pixels, and a gate driver configured to apply a gate signal to the display panel. The gate driver may include a plurality of stages, and each of the stages may include a writing selection circuit configured to apply a writing selection signal to a first inversion control node based on the writing selection signal in a writing period, a holding selection circuit configured to apply a holding selection signal to a second inversion control node based on the holding selection signal in a holding period, and a gate output circuit configured to output a first low gate voltage as a low gate voltage in response to a voltage of the first inversion control node in the writing period, and output a second low gate voltage that is different from the first low gate voltage as the low gate voltage in response to a voltage of the second inversion control node in the holding period.

In an embodiment, each of the writing selection signal and the holding selection signal may have alternating high and low level voltages.

In an embodiment, in the writing period, the writing selection signal may have the high level voltage, and the holding selection signal may have the low level voltage, and, in the holding period, the writing selection signal may have the low level voltage, and the holding selection signal may have the high level voltage.

In an embodiment, the second low gate voltage may be lower than the first low gate voltage.

In an embodiment, all transistors included in each of the stages may be N-type transistors.

In an embodiment, the gate output circuit may include a ninth transistor including a gate electrode electrically connected to a control node, a first electrode, and a second electrode connected to a gate output node through which the gate signal is output, a 10th transistor including a gate electrode connected to the first inversion control node, a first electrode configured to receive the first low gate voltage, and a second electrode connected to the gate output node, an 11th transistor including a gate electrode connected to the second inversion control node, a first electrode configured to receive the second low gate voltage, and a second electrode connected to the gate output node, and a second capacitor including a first electrode electrically connected to the control node and a second electrode connected to the gate output node.

In an embodiment, the writing selection circuit may include a 12th transistor including a gate electrode configured to receive the writing selection signal, a first electrode configured to receive the writing selection signal, and a second electrode, a 13th transistor including a gate electrode connected to the second electrode of the 12th transistor, a first electrode configured to receive the writing selection signal, and a second electrode, a 14th transistor including a gate electrode configured to receive a second gate clock signal, a first electrode connected to the second electrode of the 13th transistor, and a second electrode connected to the first inversion control node, a 15th transistor including a gate electrode connected to the control node, a first electrode configured to receive the first low gate voltage, and a second electrode connected to the gate electrode of the 13th transistor, and a third capacitor including a first electrode connected to the gate electrode of the 13th transistor and a second electrode connected to the first inversion control node, and the holding selection circuit may include a 17th transistor including a gate electrode configured to receive the holding selection signal, a first electrode configured to receive the holding selection signal, and a second electrode, an 18th transistor including a gate electrode connected to the second electrode of the 17th transistor, a first electrode configured to receive the holding selection signal, and a second electrode, a 19th transistor including a gate electrode configured to receive the second gate clock signal, a first electrode connected to the second electrode of the 18th transistor, and a second electrode connected to the second inversion control node, a 20th transistor including a gate electrode connected to the control node, a first electrode configured to receive the second low gate voltage, and a second electrode connected to the gate electrode of the 18th transistor, and a fourth capacitor including a first electrode connected to the gate electrode of the 18th transistor, and a second electrode connected to the second inversion control node.

In an embodiment, each of the stages may further include an input circuit configured to apply an input signal to the control node, and a carry output circuit configured to output a third low gate voltage that is different from the first low gate voltage and the second low gate voltage as a carry signal in response to the voltage of the first inversion control node or the voltage of the second inversion control node, the input circuit may include a first transistor including a gate electrode configured to receive a first gate clock signal, a first electrode configured to receive the input signal, and a second electrode connected to the control node, and the carry output circuit may include a sixth transistor including a gate electrode electrically connected to the control node, a first electrode, and a second electrode connected to a carry output node through which the carry signal is output, a seventh transistor including a gate electrode connected to the first inversion control node, a first electrode configured to receive the third low gate voltage, and a second electrode connected to the carry output node, and an eighth transistor including a gate electrode connected to the second inversion control node, a first electrode configured to receive the third low gate voltage, and a second electrode connected to the carry output node.

In an embodiment, the third low gate voltage may be lower than each of the first low gate voltage and the second low gate voltage.

According to the gate driver and the display device including the gate driver, the gate driver may output different low gate voltages in the writing period and the holding period. Accordingly, a luminance deviation of the display panel may be reduced in the writing period and the holding period.

BRIEF DESCRIPTION OF THE DRAWINGS

The above and other features of embodiments of the present inventive concept will become more apparent by describing in detailed embodiments thereof with reference to the accompanying drawings, in which.

DETAILED DESCRIPTION OF THE EMBODIMENTS

Hereinafter, the present inventive concept will be described in more detail with reference to the accompanying drawings.

Figure 1:
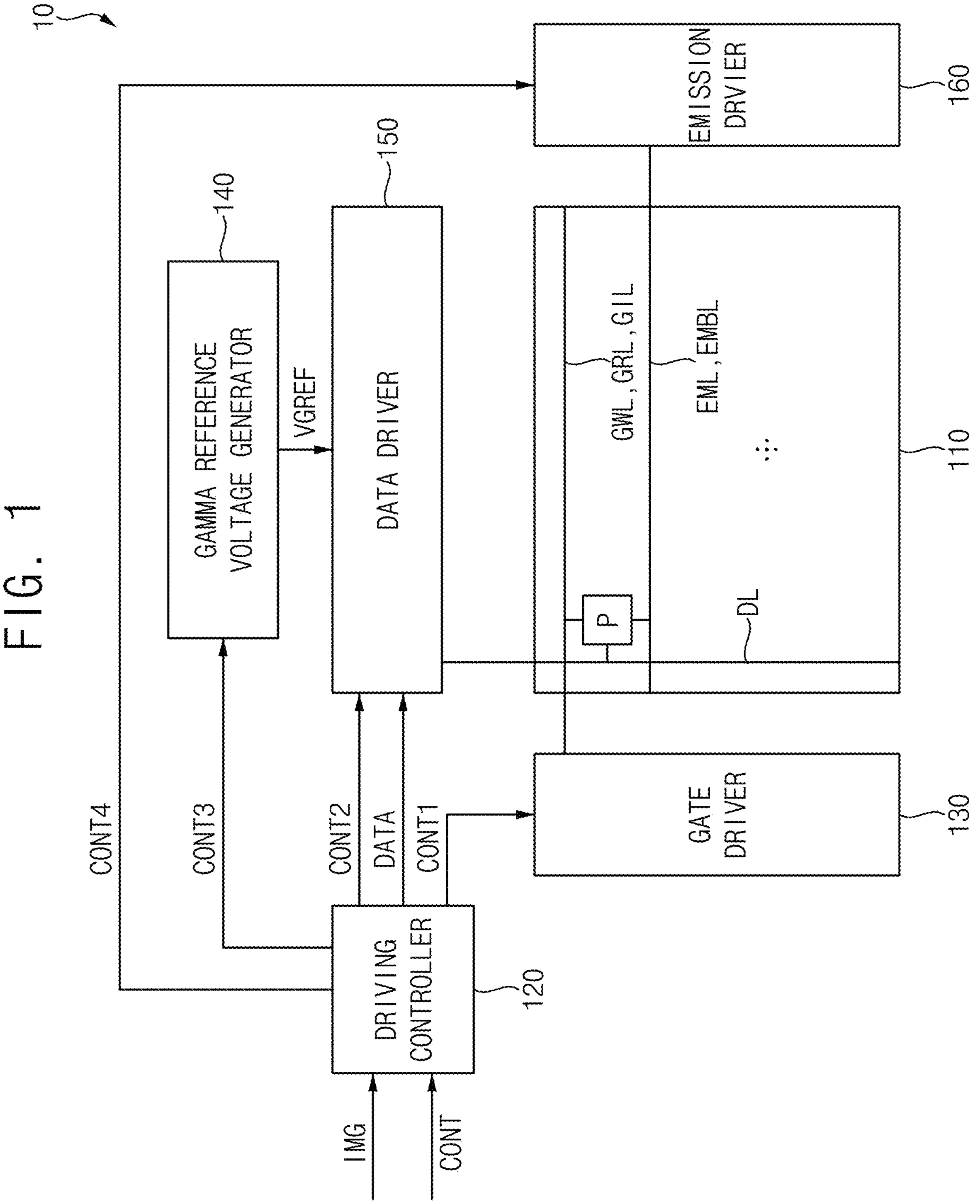
FIG. 1 is a block diagram showing a display device according to embodiments of the present inventive concept.

FIG. 1 is a block diagram showing a display device 10 according to embodiments of the present inventive concept.

Referring to FIG. 1, a display device 10 may include a display panel 110 and a display panel driver. The display panel driver may include a driving controller 120, a gate driver 130, a gamma reference voltage generator 140, a data driver 150, and an emission driver 160.

The display panel 110 may include a display area for displaying an image and a peripheral area disposed adjacent to the display area.

The display panel 110 may include gate lines GWL, GRL, and GIL, data lines DL, emission lines EML and EMBL, pixels P electrically connected to the gate lines GWL, GRL, and GTL, the data lines DL, and the emission lines EML and EMBL, respectively. The gate lines GWL, GRL, and GIL may extend in a first direction, the data lines DL may extend in a second direction crossing the first direction, and the emission lines EML and EMBL may extend in the first direction.

The driving controller 120 may receive input image data IMG and an input control signal CONT from an external device (not shown). For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 120 may generate a first control signal CONT1, a second control signal CONT2, a third control signal CONT3, a fourth control signal CONT4, and a data signal DATA based on the input image data IMG and the input control signal CONT.

The driving controller 120 may generate the first control signal CONT1 for controlling an operation of the gate driver 130 based on the input control signal CONT, and output the first control signal CONT1 to the gate driver 130. The first control signal CONT1 may include a vertical start signal and a gate clock signal.

The driving controller 120 may generate the second control signal CONT2 for controlling an operation of the data driver 150 based on the input control signal CONT, and output the second control signal CONT2 to the data driver 150. The second control signal CONT2 may include a horizontal start signal and a load signal.

The driving controller 120 may generate the data signal DATA based on the input image data IMG. The driving controller 120 may output the data signal DATA to the data driver 150.

The driving controller 120 may generate the third control signal CONT3 for controlling an operation of the gamma reference voltage generator 140 based on the input control signal CONT, and output the third control signal CONT3 to the gamma reference voltage generator 140.

The driving controller 120 may generate the fourth control signal CONT4 for controlling an operation of the emission driver 160 based on the input control signal CONT, and output the fourth control signal CONT4 to the emission driver 160.

The gate driver 130 may generate gate signals for driving the gate lines GWL, GRL, and GIL in response to the first control signal CONT1 received from the driving controller 120. The gate driver 130 may output the gate signals to the gate lines GWL, GRL, and GTL.

The gamma reference voltage generator 140 may generate a gamma reference voltage VGREF in response to the third control signal CONT3 received from the driving controller 120. The gamma reference voltage generator 140 may provide the gamma reference voltage VGREF to the data driver 150. The gamma reference voltage VGREF may have a value corresponding to each data signal DATA.

In an embodiment, the gamma reference voltage generator 140 may be disposed in the driving controller 120 or may be disposed in the data driver 150.

The data driver 150 may receive the second control signal CONT2 and the data signal DATA from the driving controller 120, and receive the gamma reference voltage VGREF from the gamma reference voltage generator 140. The data driver 150 may convert the data signal DATA into a data voltage having an analog type using the gamma reference voltage VGREF. The data driver 150 may output the data voltage to the data line DL.

The emission driver 160 may generate emission signals for driving the emission lines EML, EMBL in response to the fourth control signal CONT4 received from the driving controller 120. The emission driver 160 may output the emission signals to the emission lines EML, EMBL.

In FIG. 1, for a convenience of an explanation, the gate driver 130 may be disposed on a first side of the display panel 110 and the emission driver 160 may be disposed on a second side of the display panel 110. However, the present inventive concept is not limited thereto. For example, both the gate driver 130 and the emission driver 160 may be disposed on the first side of the display panel 110. For example, both the gate driver 130 and the emission driver 160 may be disposed on both sides of the display panel 110. For example, the gate driver 130 and the emission driver 160 may be disposed in one driver, for example, an emission driver embedded gate driver.

Figure 2:
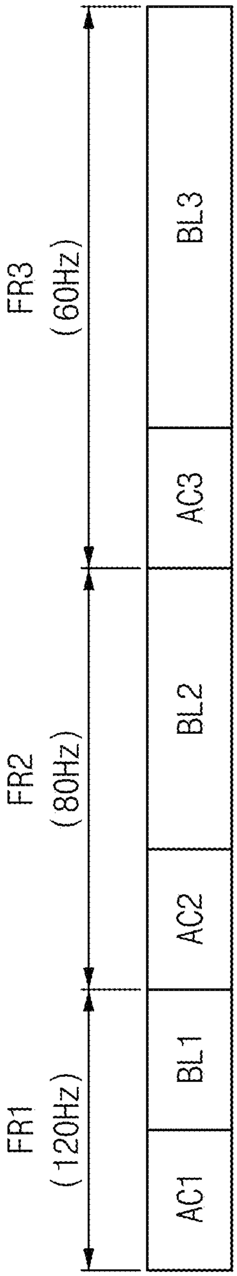
FIG. 2 is a conceptual diagram showing a driving frequency of a display panel of FIG. 1.
Figure 3:
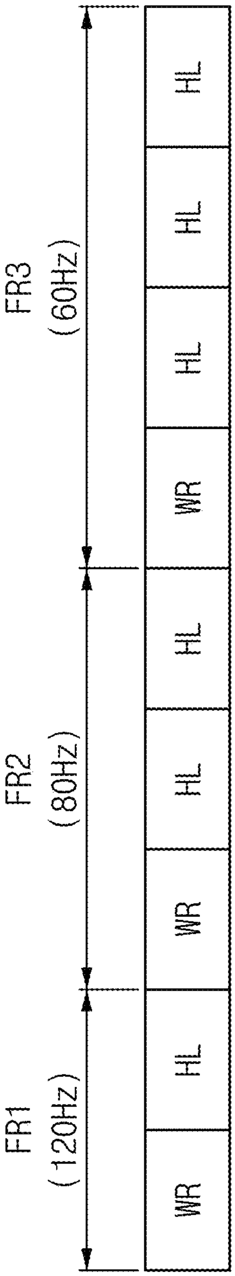
FIG. 3 is a conceptual diagram showing an example of a frame period according to a driving frequency of the display panel of FIG. 1.

FIG. 2 is a conceptual diagram showing a driving frequency of a display panel 110 of FIG. 1. FIG. 3 is a conceptual diagram showing an example of a frame period according to the driving frequency of the display panel 110 of FIG. 1.

Referring to FIG. 2, the display panel 110 may be driven at a variable frequency. A first frame period FP1 having a first driving frequency may include a first active period AC1 and a first blank period BL1. A second frame period FP2 having a second driving frequency that is different from the first driving frequency may include a second active period AC2 and a second blank period BL2. A third frame period FP3 having a third driving frequency that is different from the first driving frequency and the second driving frequency may include a third active period AC3 and a third blank period BL3.

For example, as shown in FIG. 2, the first frame period FP1 may have a driving frequency of 120 Hz, the second frame period FP2 may have a driving frequency of 80 Hz, and the third frame period FP3 may have a driving frequency of 60 Hz.

The first active period AC1 may have the same length as the second active period AC2, and the first blank period BL1 may have a length that is different from a length of the second blank period BL2.

The second active period AC2 may have the same length as the third active period AC3, and the second blank period BL2 may have a length that is different from a length of the third blank period BL3.

A display device that supports a variable frequency may include a writing period in which a data voltage is written to a pixel, and a holding period in which only emission of a light is performed without writing the data voltage to the pixel. The writing period may be arranged within the active periods AC1, AC2, and AC3. The holding period may be arranged within the blank periods BL1, BL2, and BL3.

Referring to FIG. 3, the first frame period FP1 may have one writing period WR and one holding period HL. The writing period WR included in the first frame period FP1 may correspond to the first active period AC1 described with reference to FIG. 2. The holding period HL included in the first frame FR1 may correspond to the first blank period BL1 described with reference to FIG. 2.

The second frame period FP2 may include one writing period WR and two holding periods HL. The two holding periods HL may be consecutive to each other. The writing period WR included in the second frame period FP2 may correspond to the second active period AC2 described with reference to FIG. 2. The holding periods HL included in the second frame period FP2 may correspond to the second blank period BL2 described with reference to FIG. 2.

The third frame period FP3 may include one writing period WR and three holding periods HL. The three holding periods HL may be consecutive to each other. The writing period WR included in the third frame period FP3 may correspond to the third active period AC3 described with reference to FIG. 2. The holding periods HL included in the third frame period FP3 may correspond to the third blank period BL3 described with reference to FIG. 2.

Figure 4:
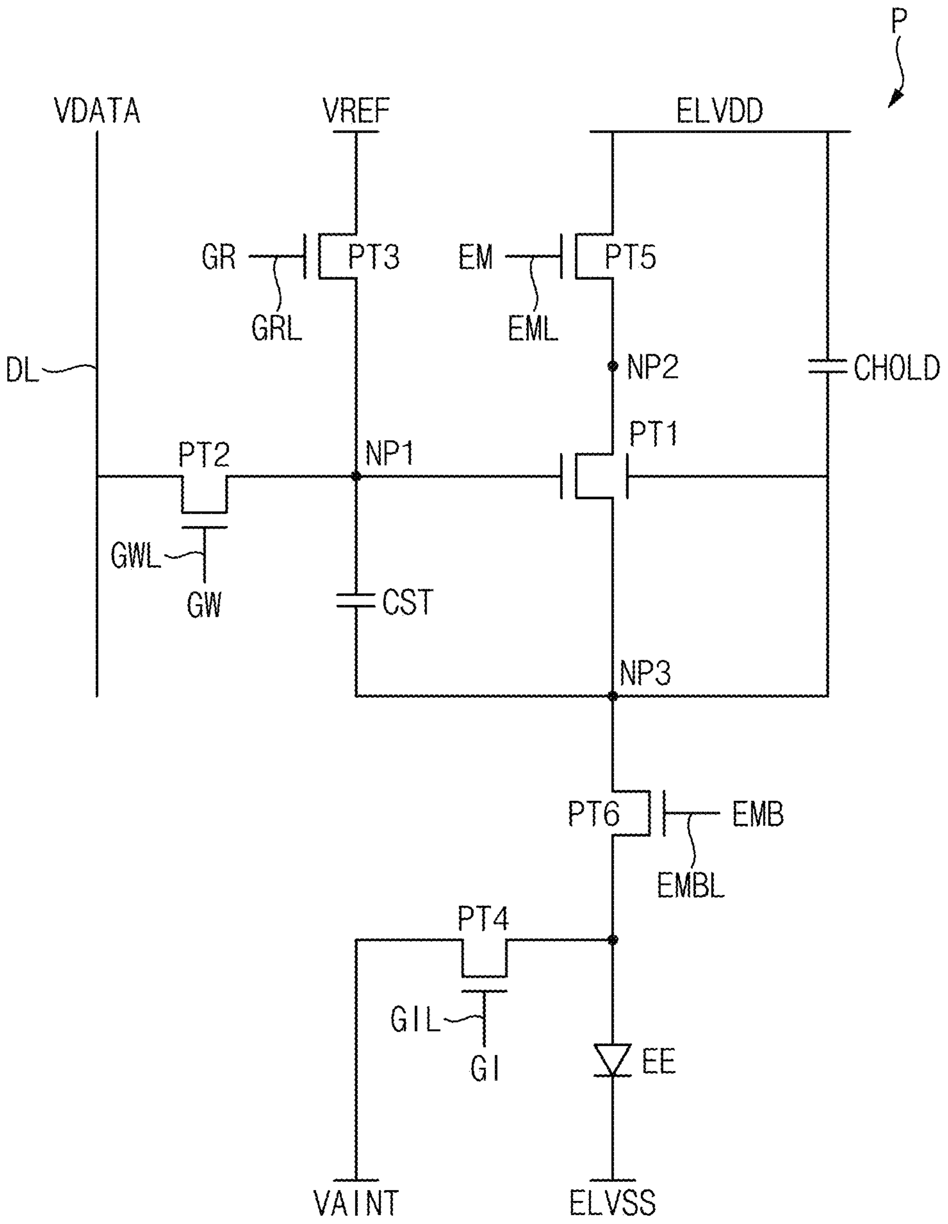
FIG. 4 is a circuit diagram showing an example of a pixel of the display panel of FIG. 1.
Figure 5:
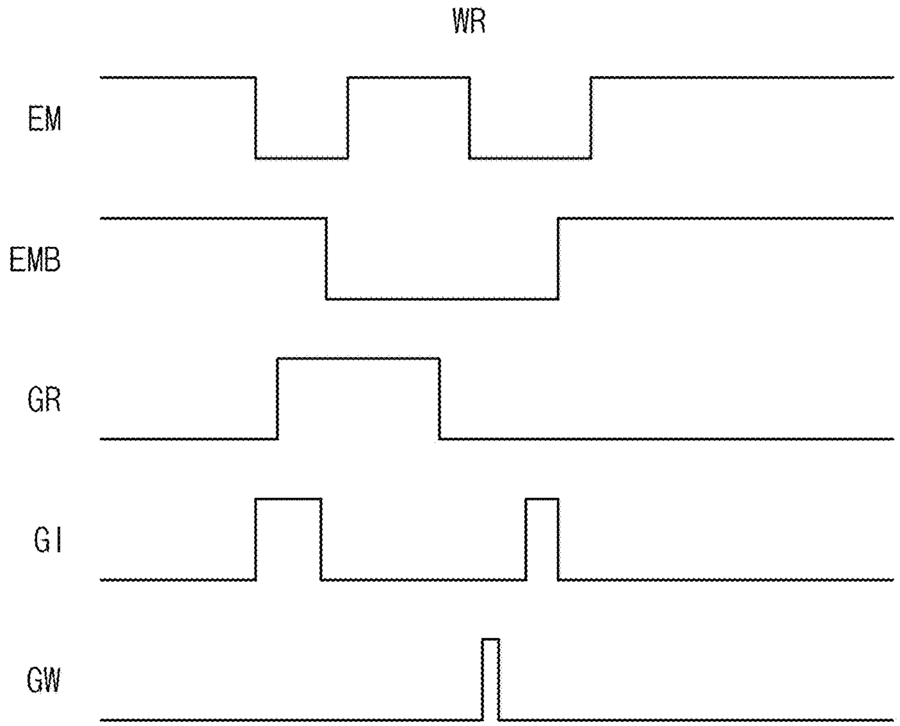
FIG. 5 is a timing diagram showing an example of gate signals and emission signals applied to the pixel of FIG. 4 in a writing period.
Figure 6:
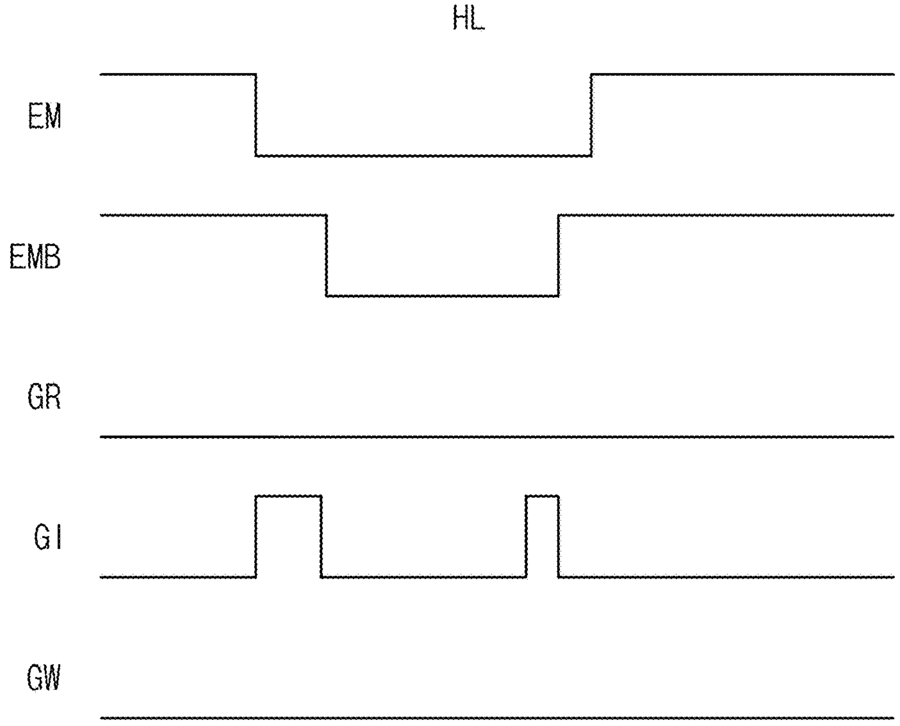
FIG. 6 is a timing diagram showing an example of the gate signals and the emission signals applied to the pixel of FIG. 4 in a holding period.

FIG. 4 is a circuit diagram showing an example of a pixel P of the display panel 110 of FIG. 1. FIG. 5 is a timing diagram showing an example of gate signals GW, GR, and GI and emission signals EM and EMB applied to the pixel P of FIG. 4 in a writing period WR. FIG. 6 is a timing diagram showing an example of the gate signals GW, GR, and GI and the emission signals EM and EMB applied to the pixel P of FIG. 4 in a holding period HL.

Referring to FIGS. 4 to 6, the pixel P may include a first pixel transistor PT1, a second pixel transistor PT2, a third pixel transistor PT3, a fourth pixel transistor PT4, a fifth pixel transistor PT5, a sixth pixel transistor PT6, a storage capacitor CST, a hold capacitor CHOLD, and a light emitting element EE. In an embodiment, the first pixel transistor PT1, the second pixel transistor PT2, the third pixel transistor PT3, the fourth pixel transistor PT4, the fifth pixel transistor PT5, and the sixth pixel transistor PT6 may be N-type transistors. The N-type transistor may be turned off in response to a low gate voltage and may be turned on in response to a high gate voltage.

The first pixel transistor PT1 (i.e., a driving transistor) may include a gate electrode connected to a first pixel node NP1, a first electrode connected to a second pixel node NP2, a second electrode connected to a third pixel node NP3, and a back gate electrode connected to the third pixel node NP3.

The second pixel transistor PT2 may include a gate electrode configured to receive a data write gate signal GW through a data write gate signal line GWL, a first electrode configured to receive a data voltage VDATA through a data line DL, and a second electrode connected to the first pixel node NP1.

The third pixel transistor PT3 may include a gate electrode configured to receive a reference voltage gate signal GR through a reference voltage gate signal line GRL, a first electrode configured to receive a reference voltage VREF, and a second electrode connected to the first pixel node NP1.

The fourth pixel transistor PT4 may include a gate electrode configured to receive an anode initialization gate signal GI through a anode initialization gate signal line GTL, a first electrode configured to receive an anode initialization voltage VAINT, and a second electrode connected to an anode electrode of the light emitting element EE.

The fifth pixel transistor PT5 may include a gate electrode configured to receive a first emission signal EM through a first emission signal line EML, a first electrode configured to receive a first power voltage ELVDD, and a second electrode connected to the second pixel node NP2.

The sixth pixel transistor PT6 may include a gate electrode configured to receive a second emission signal EMB through a second emission signal line EMBL, a first electrode connected to the third pixel node NP3, and a second electrode connected to the anode electrode.

The storage capacitor CST may include a first electrode connected to the first pixel node NP1 and a second electrode connected to the third pixel node NP3.

The hold capacitor CHOLD may include a first electrode configured to receive the first power voltage ELVDD and a second electrode connected to the third pixel node NP3.

The light emitting element EE may include the anode electrode and a cathode electrode configured to receive a second power voltage ELVSS.

However, a configuration of the pixel according to the present inventive concept is not limited to the example of FIG. 4. The configuration of the pixel according to the present inventive concept may include any configuration of the pixel which may be driven at a variable frequency.

In the writing period WR, the first emission signal EM may have an activation pulse, the second emission signal EMB may have an activation pulse, the reference voltage gate signal GR may have an activation pulse, the anode initialization gate signal GI may have an activation pulse, and the data write gate signal GW may have an activation pulse.

When the first emission signal EM has the activation pulse, the fifth pixel transistor PT5 may be turned on. When the second emission signal EMB has the activation pulse, the sixth pixel transistor PT6 may be turned on. When the reference voltage gate signal GR has the activation pulse, the third pixel transistor PT3 may be turned on. When the anode initialization gate signal GI has the activation pulse, the fourth pixel transistor PT4 may be turned on. When the data write gate signal GW has the activation pulse, the second pixel transistor PT2 may be turned on.

In the writing period WR, a data initialization operation may be performed by the third pixel transistor PT3, a data writing operation may be performed by the second pixel transistor PT2, and an anode initialization operation may be performed by the fourth pixel transistor PT4.

In the holding period HL, the first emission signal EM may have the activation pulse, the second emission signal EMB may have the activation pulse, the reference voltage gate signal GR may maintain an inactivation gate voltage without having the activation pulse, the anode initialization gate signal GI may have the activation pulse, and the data write gate signal GW may maintain an inactivation gate voltage without having the activation pulse. In this case, the inactivation gate voltage may be a low gate voltage, and the activation pulse may be a pulse of a high gate voltage.

In the holding period HL, the data initialization operation may not be performed because the third pixel transistor PT3 is turned-off throughout the holding period, and the data writing operation may not be performed because the second pixel transistor PT2 is turned-off throughout the holding period. The anode initialization operation may be performed by the fourth pixel transistor PT4 which is periodically turned-on during the holding period.

Figure 7:
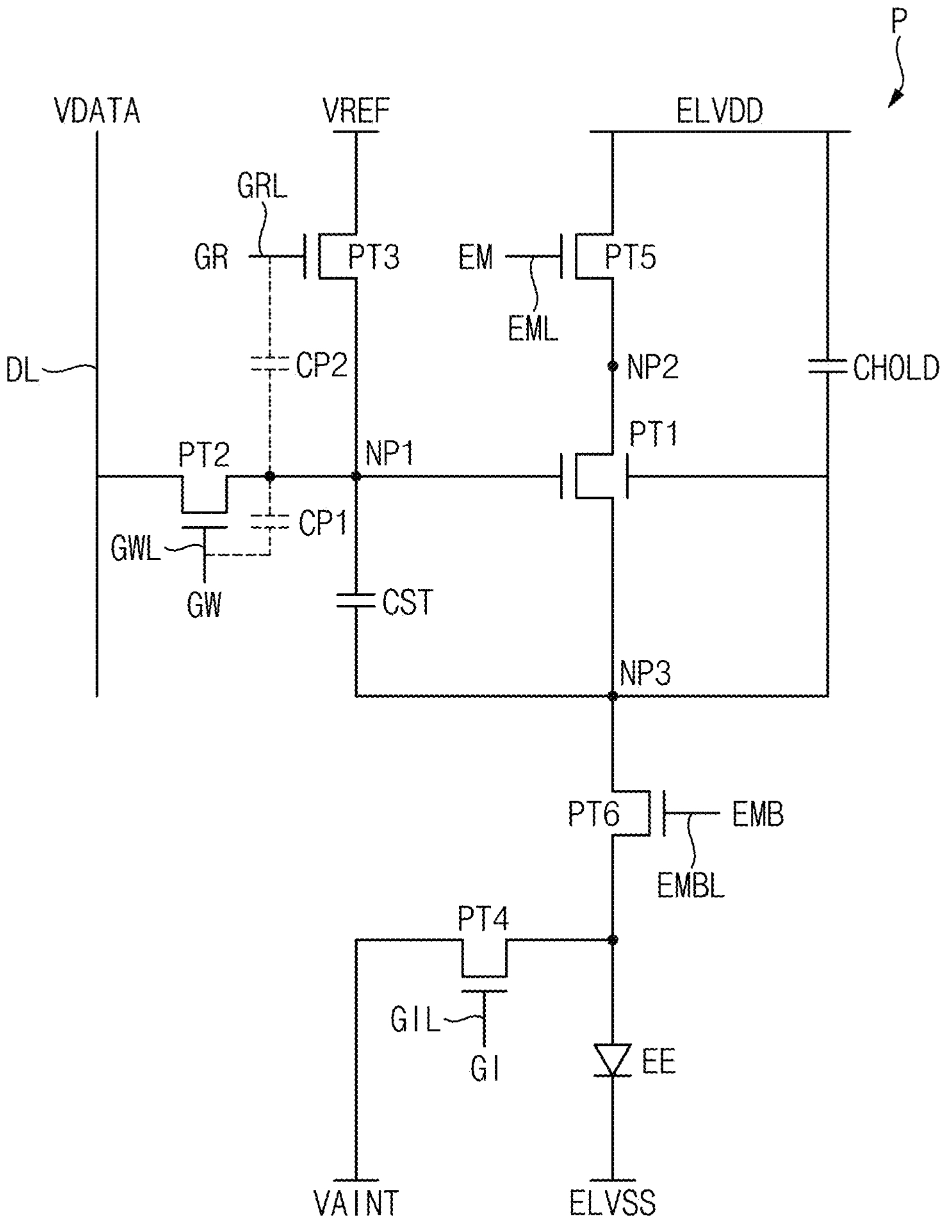
FIG. 7 is a circuit diagram showing a first parasitic capacitor and a second parasitic capacitor of the pixel of FIG. 4.

FIG. 7 is a circuit diagram showing a first parasitic capacitor and a second parasitic capacitor of the pixel of FIG. 4.

Referring to FIGS. 4 to 7, the pixel P may further include a first parasitic capacitor CP1 located between the data write gate signal line GWL and the first pixel node NP1, and a second parasitic capacitor CP2 located between the reference voltage gate signal line GRL and the first pixel node NP1.

Since the first pixel node NP1 is floated during the holding period HL due to the turned-off second pixel transistor PT2 and third pixel transistor PT3, a voltage of the gate electrode of the first pixel transistor PT1 may be affected by the first parasitic capacitor CP1 and the second parasitic capacitor CP2 during the holding period.

In order to prevent the luminance deviation of the display panel 110 due to a fluctuation of a voltage of the first pixel node NP1 which is connected to the gate electrode of the first pixel transistor PT1, the inactivation gate voltage of the data write gate signal GW may be different in the writing period WR and the holding period HL, or the inactivation gate voltage of the reference voltage gate signal GR may be different in the writing period WR and the holding period HL.

The inactivation gate voltage in the writing period WR and the holding period HL may vary depending on the configuration of the pixel.

Figure 8:
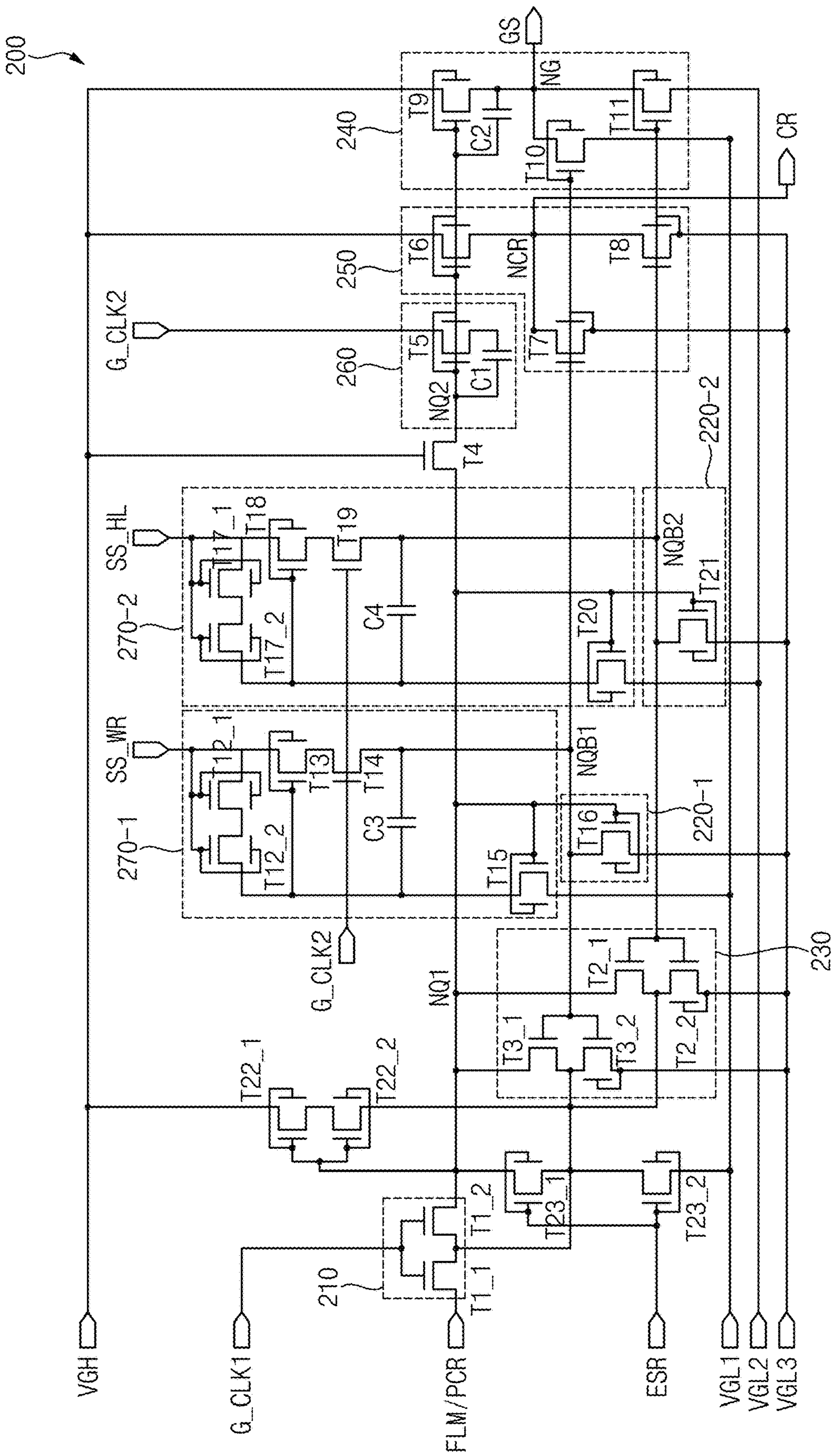
FIG. 8 is a circuit diagram showing an example of each of stages included in a gate driver according to embodiments of the present inventive concept.

FIG. 8 is a circuit diagram showing an example of each of stages 200 included in a gate driver 130 according to embodiments of the present inventive concept.

Referring to FIG. 8, according to embodiments of the present inventive concept, the gate driver 130 may include a plurality of stages. Each of the stages 200 may generate a gate signal GS. Each of the stages 200 may include a writing selection circuit 270-1, a holding selection circuit 270-2, and a gate output circuit 240. In an embodiment, each of the stages 200 may further include an input circuit 210 and a carry output circuit 250. In an embodiment, each of the stages 200 may further include a first inversion control circuit 220-1, a second inversion control circuit 220-2, and a control circuit 230. In an embodiment, each of the stages 200 may further include a boosting circuit 260.

The input circuit 210 may apply an input signal FLM/PCR to a control node NQ1 and NQ2. The input signal FLM/PCR may be a gate start signal FLM or a previous carry signal PCR. The gate start signal FLM may be a signal that starts an operation of a first stage among the stages. The previous carry signal PCR may be a carry signal that is output from one of previous stages. In an embodiment, the input circuit 210 may include a first transistor T1_1 and T1_2.

The first transistor T1_1 and T1_2 may include a gate electrode configured to receive a first gate clock signal G_CLK1, a first electrode configured to receive the input signal FLM/PCR, and a second electrode connected to the control node NQ1 and NQ2. The first transistor T1_1 and T1_2 may apply the input signal FLM/PCR to the control node NQ1 and NQ2 in response to the first gate clock signal G_CLK1. In an embodiment, the first transistor T1_1 and T1_2 may include a first-first transistor T1_1 and a first-second transistor T1_2, which are connected in series and have gate electrodes connected to each other.

The first inversion control circuit 220-1 may control a voltage of a first inversion control node NQB1 based on a voltage of the control node NQ1 and NQ2. In an embodiment, the first inversion control circuit 220-1 may include a 16th transistor T16.

The 16th transistor T16 may include a gate electrode connected to the control node NQ1 and NQ2, a first electrode configured to receive a third low gate voltage VGL3, and a second electrode connected to the first inversion control node NQB1. The 16th transistor T16 may apply the third low gate voltage VGL3 to the first inversion control node NQB1 in response to the voltage of the control node NQ1 and NQ2 which has an active level. In an embodiment, the 16th transistor T16 may further include a back gate electrode connected to the control node NQ1 and NQ2.

The second inversion control circuit 220-2 may control a voltage of a second inversion control node NQB2 based on the voltage of the control node NQ1 and NQ2. In an embodiment, the second inversion control circuit 220-2 may include a 21st transistor T21.

The 21st transistor T21 may include a gate electrode connected to the control node NQ1 and NQ2, a first electrode configured to receive the third low gate voltage VGL3, and a second electrode connected to the second inversion control node NQB2. The 21st transistor T21 may apply the third low gate voltage VGL3 to the second inversion control node NQB2 in response to the voltage of the control node NQ1 and NQ2 which has an active level. In an embodiment, the 21st transistor T21 may further include a back gate electrode connected to the control node NQ1 and NQ2.

The control circuit 230 may control the voltage of the control node NQ1 and NQ2 based on the voltage of the first inversion control node NQB1 or the voltage of the second inversion control node NQB2. In an embodiment, the control circuit 230 may include a second transistor T2_1 and T2_2 and a third transistor T3_1 and T3_2.

The second transistor T2_1 and T2_2 may include a gate electrode connected to the second inversion control node NQB2, a first electrode configured to receive the third low gate voltage VGL3, and a second electrode connected to the control node NQ1 and NQ2. The second transistor T2_1 and T2_2 may apply the third low gate voltage VGL3 to the control node NQ1 and NQ2 in response to the voltage of the second inversion control node NQB2 which has an active level. In an embodiment, the second transistor T2_1 and T2_2 may include a second-first transistor T2_1 and a second-second transistor T2_2, which are connected in series and have gate electrodes connected to each other. In an embodiment, the second-second transistor T2_2 may further include a back gate electrode connected to the third low gate voltage VGL3.

The third transistor T3_1 and T32 may include a gate electrode connected to the first inversion control node NQB1, a first electrode configured to receive the third low gate voltage VGL3, and a second electrode connected to the control node NQ1 and NQ2. The third transistor T3_1 and T3_2 may apply the third low gate voltage VGL3 to the control node NQ1 and NQ2 in response to the voltage of the first inversion control node NQB1 which has an active level. In an embodiment, the third transistor T3_1 and T3_2 may include a third-first transistor T3_1 and a third-second transistor T3_2, which are connected in series and have gate electrodes connected to each other. In an embodiment, the third-second transistor T3_2 may further include a back gate electrode connected to the third low gate voltage VGL3.

The gate output circuit 240 may output a high gate voltage VGH as the gate signal GS in response to the voltage of the control node NQ1 and NQ2 which has an active level, and output a first low gate voltage VGL1 or a second low gate voltage VGL2 as the gate signal GS in response to the voltage of the first inversion control node NQB1 which has an active level or the voltage of the second inversion control node NQB2 which has an active level. In an embodiment, the gate output circuit 240 may include a ninth transistor T9, a 10th transistor T10, an 11th transistor T11, and a second capacitor C2.

The ninth transistor T9 may include a gate electrode connected to the control node NQ1 and NQ2, a first electrode configured to receive the high gate voltage VGH, and a second electrode connected to a gate output node NG through which the gate signal GS is output. The ninth transistor T9 may apply the high gate voltage VGH to the gate output node NG in response to the voltage of the control node NQ1 and NQ2 which has an active level. In an embodiment, the ninth transistor T9 may further include a back gate electrode connected to the control node NQ1 and NQ2.

The 10th transistor T10 may include a gate electrode connected to the first inversion control node NQB1, a first electrode configured to receive the first low gate voltage VGL1, and a second electrode connected to the gate output node NG. The 10th transistor T10 may apply the first low gate voltage VGL1 to the gate output node NG in response to the voltage of the first inversion control node NQB1 which has an active level. In an embodiment, the 10th transistor T10 may further include a back gate electrode connected to the first inversion control node NQB1.

The 11th transistor T11 may include a gate electrode connected to the second inversion control node NQB2, a first electrode configured to receive the second low gate voltage VGL2, and a second electrode connected to the gate output node NG. The 11th transistor T11 may apply the second low gate voltage VGL2 to the gate output node NG in response to the voltage of the second inversion control node NQB2. In an embodiment, the 11th transistor T11 may further include a back gate electrode connected to the second inversion control node NQB2.

The second capacitor C2 may include a first electrode connected to the control node NQ1 and NQ2, and a second electrode connected to the gate output node NG. The second capacitor C2 may reduce distortion of a waveform of the gate signal GS.

The carry output circuit 250 may output the high gate voltage VGH as a carry signal CR in response to the voltage of the control node NQ1 and NQ2 which has an active level, and output the third low gate voltage VGL3 as the carry signal CR in response to the voltage of the first inversion control node NQB1 or the voltage of the second inversion control node NQB2. In an embodiment, the carry output circuit 250 may include a sixth transistor T6, a seventh transistor T7, and an eighth transistor T8.

The sixth transistor T6 may include a gate electrode connected to the control node NQ1 and NQ2, a first electrode configured to receive the high gate voltage VGH, and a second electrode connected to a carry output node NCR through which the carry signal CR is output. The sixth transistor T6 may apply the high gate voltage VGH to the carry output node NCR in response to the voltage of the control node NQ1 and NQ2 which has an active level. In an embodiment, the sixth transistor T6 may further include a back gate electrode connected to the control node NQ1 and NQ2.

The seventh transistor T7 may include a gate electrode connected to the first inversion control node NQB1, a first electrode configured to receive the third low gate voltage VGL3, and a second electrode connected to the carry output node NCR. The seventh transistor T7 may apply the third low gate voltage VGL3 to the carry output node NCR in response to the voltage of the first inversion control node NQB1 which has an active level. In an embodiment, the seventh transistor T7 may further include a back gate electrode configured to receive the third low gate voltage VGL3.

The eighth transistor T8 may include a gate electrode connected to the second inversion control node NQB2, a first electrode configured to receive the third low gate voltage VGL3, and a second electrode connected to the carry output node NCR. The eighth transistor T8 may apply the third low gate voltage VGL3 to the carry output node NCR in response to the voltage of the second inversion control node NQB2 which has an active level. In an embodiment, the eighth transistor T8 may further include a back gate electrode configured to receive the third low gate voltage VGL3.

The boosting circuit 260 may boost the voltage of the control node NQ1 and NQ2. The boosting circuit 260 may include a fifth transistor T5 and a first capacitor C1.

The fifth transistor T5 may include a gate electrode connected to the control node NQ1 and NQ2, a first electrode configured to receive a second gate clock signal G_CLK2, and a second electrode. The first gate clock G_CLK1 and the second gate clock signal G_CLK2 may have different timings.

The first capacitor C1 may include a first electrode connected to the control node NQ1 and NQ2, and a second electrode connected to the second electrode of the fifth transistor T5. The first capacitor C1 may boost the voltage of the control node NQ1 and NQ2. Since the voltage of the control node NQ1 and NQ2 (the voltage of the gate electrode of the ninth transistor T9) is boosted by the first capacitor C1, the ninth transistor T9 may smoothly apply the high gate voltage VGH to the gate output node NG. In addition, since the voltage of the control node NQ1 and NQ2 (the voltage of the gate electrode of the sixth transistor T6) is boosted by the first capacitor C1, the sixth transistor T6 may smoothly apply the high gate voltage VGH to the carry output node NCR.

The writing selection circuit 270-1 may apply a writing selection signal SS_WR to the first inversion control node NQB1 based on the writing selection signal SS_WR in the writing period WR. For example, the writing selection circuit 270-1 may activate the seventh transistor T7 and the 10th transistor T10. In an embodiment, the writing selection circuit 270-1 may include a 12th transistor T12_1 and T12_2, a 13th transistor T13, a 14th transistor T14, a 15th transistor T15, and a third capacitor C3.

The 12th transistor T12_1 and T12_2 may include a gate electrode configured to receive the writing selection signal SS_WR, a first electrode configured to receive the writing selection signal SS_WR, and a second electrode. In an embodiment, the 12th transistor T12_1 and T12_2 may include a 12th-first transistor T12_1 and a 12th-second transistor T12_2 which are connected in series and have gate electrodes connected to each other. The 13th transistor T13 may include a gate electrode connected to the second electrode of the 12th transistor T12_1 and T12_2, a first electrode configured to receive the writing selection signal SS_WR, and a second electrode. The 14th transistor T14 may include a gate electrode configured to receive the second gate clock signal G_CLK2, a first electrode connected to the second electrode of the 13th transistor T13, and a second electrode connected to the first inversion control node NQB1. The 15th transistor T15 may include a gate electrode connected to the control node NQ1 and NQ2, a first electrode configured to receive the first low gate voltage VGL1, and a second electrode connected to the gate electrode of the 13th transistor T13. The third capacitor C3 may include a first electrode connected to the gate electrode of the 13th transistor T13, and a second electrode connected to the first inversion control node NQB1. The third capacitor C3 may speed up turn-on and turn-off of the 13th transistor T13.

The holding selection circuit 270-2 may apply a holding selection signal SS_HL to the second inversion control node NQB2 based on the holding selection signal SS_HL in the holding period HL. For example, the holding selection circuit 270-2 may activate the eighth transistor T8 and the 11th transistor T11 based on the holding selection signal SS_HL. In an embodiment, the holding selection circuit 270-2 may include a 17th transistor T17_1 and T17_2, an 18th transistor T18, a 19th transistor T19, a 20th transistor T20, and a fourth capacitor C4.

The 17th transistor T17_1 and T17_2 may include a gate electrode configured to receive the holding selection signal SS_HL, a first electrode configured to receive the holding selection signal SS_HL, and a second electrode. In an embodiment, the 17th transistor T17_1 and T17_2 may include a 17th-first transistor T17_1 and a 17th-second transistor T17_2 which are connected in series and have gate electrodes connected to each other. The 18th transistor T18 may include a gate electrode connected to the second electrode of the 17th transistor T17_1 and T17_2, a first electrode configured to receive the holding selection signal SS_HL, and a second electrode. The 19th transistor T19 may include a gate electrode configured to receive the second gate clock signal G_CLK2, a first electrode connected to the second electrode of the 18th transistor T18, and a second electrode connected to the second inversion control node NQB2. The 20th transistor T20 may include a gate electrode connected to the control node NQ1 and NQ2, a first electrode configured to receive the second low gate voltage VGL2, and a second electrode connected to the gate electrode of the 18th transistor T18. The fourth capacitor C4 may include a first electrode connected to the gate electrode of the 18th transistor T18, and a second electrode connected to the second inversion control node NQB2. The fourth capacitor C4 may speed up turn-on and turn-off of the 18th transistor T18.

The writing selection signal SS_WR and the holding selection signal SS_HL may have mutually different phases (e.g., opposite phases). Each of the writing selection signal SS_WR and the holding selection signal SS_HL may have alternating high and low level voltages. In an embodiment, in the writing period WR, the writing selection signal SS_WR and the holding selection signal SS_HL may have the high level voltage and the low level voltage, respectively, so that the seventh transistor T7 and the 10th transistor T10 may be turned-on. In addition, in the holding period HL after the writing period WR, the writing selection signal SS_WR and the holding selection signal SS_HL may have the low level voltage and the high level voltage, respectively, so that the eighth transistor T8 and the 11th transistor T11 may be turned-on.

In an embodiment, each of the stages 200 may further include a 23rd transistor T23_1 and T23_2. The 23rd transistor T23_1 and T23_2 may include a gate electrode configured to receive a global control signal ESR, a first electrode configured to receive the first low gate voltage VGL1, and a second electrode connected to the control node NQ1 and NQ2. The 23rd transistor T23_1 and T23_2 may apply the first low gate voltage VGL1 to the control node NQ1 and NQ2 in response to the global control signal ESR. In an embodiment, the 23rd transistor T23_1 and T23_2 may include a 23rd-first transistor T23_1 and a 23rd-second transistor T23_2, which are connected in series and have gate electrodes connected to each other.

In an embodiment, the global control signal ESR may be substantially simultaneously applied to the stages when the display device is powered on. The 23rd transistors T23_1 and T23_2 of the stages may substantially simultaneously reset the control nodes NQ1 and NQ2 of the stages to the first low gate voltage VGL1 in response to the global control signal ESR.

In an embodiment, each of the stages 200 may further include a 22nd transistor T22_1 and T22_2. The 22nd transistor T22_1 and T22_2 may include a gate electrode connected to the control node NQ1 and NQ2, a first electrode configured to receive the high gate voltage VGH, and a second electrode connected to a middle node of the first transistor T1_1 and T1_2, a middle node of the second transistor T2_1 and T2_2, a middle node of the third transistor T3_1 and T3_2, and a middle node of the 23rd transistor T23_1 and T23_2. The 22nd transistor T22_1 and T22_2 may apply the high gate voltage VGH to the middle node of the first transistor T1_1 and T1_2, the middle node of the second transistor T2_1 and T2_2, the middle node of the third transistor T3_1 and T3_2, and the middle node of the 23rd transistor T23_1 and T23_2 in response to the voltage of the control node NQ1 and NQ2 which has an active level. Even when the voltage of the control node NQ1 and NQ2 is boosted, since the 22nd transistor T22_1 and T22_2 applies the high gate voltage VGH to the middle node of the first transistor T1_1 and T1_2, the middle node of the second transistor T2_1 and T2_2, the middle node of the third transistor T3_1 and T32, and the middle node of the 23rd transistor T23_1 and T23 2, the first transistor T1_1 and T1_2, the second transistor T2_1 and T2_2, the third transistor, and the 23rd transistor T23_1 and T23_2 may be prevented from deteriorating. In an embodiment, the 22nd transistor T22_1 and T22_2 may include a 22nd-first transistor T22_1 and a 22nd-second transistor T22_2, which are connected in series and have gate electrodes connected to each other.

In an embodiment, the control node NQ1 and NQ2 may include a first control node NQ1 and a second control node NQ2, and each of the stages 200 may further include a fourth transistor T4.

The fourth transistor T4 may include a gate electrode configured to receive the high gate voltage VGH, a first electrode connected to the first control node NQ1, and a second electrode connected to the second control node NQ2. The fourth transistor T4 may prevent or reduce transmission of a boosted voltage of the second control node NQ2 to the first control node NQ1. Accordingly, stresses of the first transistor T1_1 and T1_2, the second transistor T2_1 and T2_2, the third transistor T3_1 and T3_2, the 15th transistor T15, the 16th transistor T16, the 20th transistor T20, the 21st transistor T21, the 22nd transistor T22_1 and T22 2, and the 23rd transistor T23_1 and T23_2, which are connected to the first control node NQ1, may be relieved.

In an embodiment, all the transistors T1_1, T1_2, T2_1, T2_2, T3_1, T3_2, T4, T5, T6, T7, T8, T9, T10, T11, T12_1, T12_2, T13, T14, T15, T16, T17_1, T17_2, T18, T19, T20, T21, T22_1, T22_2, T23_1, and T23_2 included in each of the stages 200 may be N-type transistors (e.g., NMOS transistors) or oxide transistors. However, all the transistors T1_1, T1_2, T2_1, T2_2, T3_1, T3_2, T4, T5, T6, T7, T8, T9, T10, T11, T12_1, T12_2, T13, T14, T15, T16, T17_1, T17_2, T18, T19, T20, T21, T22_1, T22_2, T23_1, and T23_2 included in each of the stages 200 may be implemented as a P-type transistors (e.g., PMOS transistor). Moreover, some of the transistors T1_1, T1_2, T2_1, T2_2, T3_1, T3_2, T4, T5, T6, T7, T8, T9, T10, T1 T12_1, T12_2, T13, T14, T15, T16, T17_1, T17_2, T18, T19, T20, T21, T22_1, T22_2, T23_1, and T23_2 included in each of the stages 200 may be implemented as a N-type transistors (e.g., NMOS transistors) or oxide transistors, and others of the transistors T1_1, T1_2, T2_1, T2_2, T3_1, T3_2, T4, T5, T6, T7, T8, T9, T10, T11, T12_1, T12_2, T13, T14, T15, T16, T17_1, T17_2, T18, T19, T20, T21, T22_1, T22_2, T23_1, and T23_2 included in each of the stages 200 may be implemented as a P-type transistors (e.g., PMOS transistor).

Each of the stages 200 may receive the input signal FLM/PCR, the high gate voltage VGH, the first low gate voltage VGL1, the second low gate voltage VGL2, the third low gate voltage VGL3, the first gate clock signal G_CLK1, and the second gate clock signal G_CLK2. The high gate voltage VGH may be higher than each of the first low gate voltage VGL1, the second low gate voltage VGL2, and the third low gate voltage VGL3, and the third low gate voltage VGL3 may be lower than each of the first low gate voltage VGL1 and the second low gate voltage VGL2.

In an embodiment, the first low gate voltage VGL1 may be higher than the second low gate voltage VGL2 and, according to another embodiment, the first low gate voltage VGL1 may be lower than the second low gate voltage VGL2.

As described above, the gate driver 130 may output mutually different low gate voltages in the writing period WR and the holding period HL. Accordingly, the luminance deviation of the display panel 110 may be reduced in the writing period WR and the holding period HL.

Figure 9:
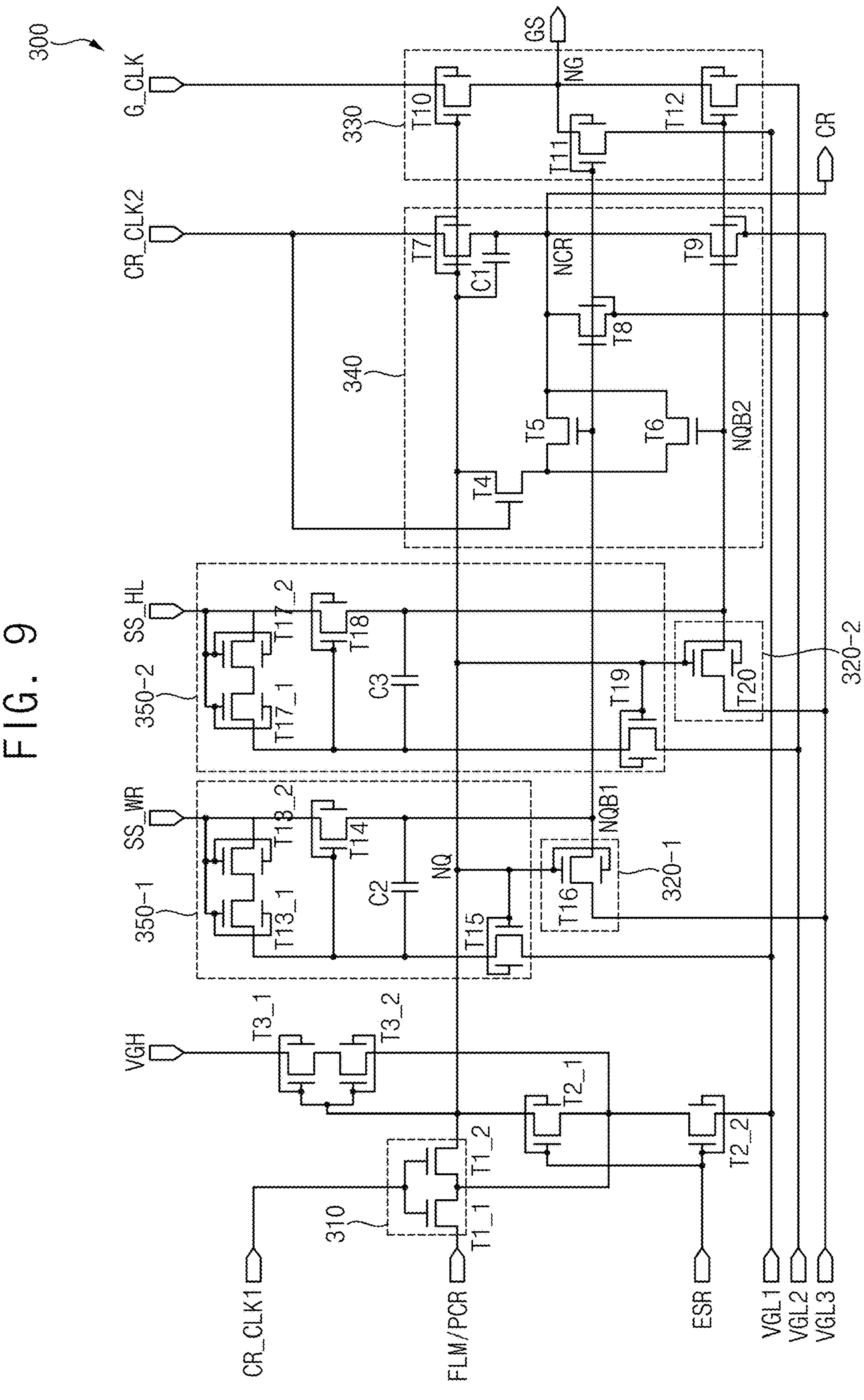
FIG. 9 is a circuit diagram showing an example of each of stages included in the gate driver according to embodiments of the present inventive concept.

FIG. 9 is a circuit diagram showing an example of each of stages included in a gate driver according to embodiments of the present inventive concept.

Referring to FIG. 9, according to embodiments of the present inventive concept, the gate driver 130 may include a plurality of stages. Each of the stages 300 may generate a gate signal GS. Each of the stages 300 may include a writing selection circuit 350-1, a holding selection circuit 350-2, and a gate output circuit 330. In an embodiment, each of the stages 300 may further include an input circuit 310 and a carry output circuit 340. In an embodiment, each of the stages 300 may further include a first inversion control circuit 320-1 and a second inversion control circuit 320-2.

The input circuit 310 may apply an input signal FLM/PCR to a control node NQ. The input signal FLM/PCR may be a gate start signal FLM or a previous carry signal PCR. The gate start signal FLM may be a signal that starts an operation of a first stage among the stages. The previous carry signal PCR may be a carry signal that is output from one of previous stages. In an embodiment, the input circuit 310 may include a first transistor T1_1 and T1_2.

The first transistor T1_1 and T1_2 may include a gate electrode configured to receive a first carry clock signal CR_CLK1, a first electrode configured to receive the input signal FLM/PCR, and a second electrode connected to the control node NQ. The first transistor T1_1 and T1_2 may apply the input signal FLM/PCR to the control node NQ in response to the first carry clock signal CR_CLK1 which has an active level. In an embodiment, the first transistor T1_1 and T1_2 may include a first-first transistor T1_1 and a first-second transistor T1_2 which are connected in series and have gate electrodes connected to each other.

The first inversion control circuit 320-1 may control a voltage of a first inversion control node NQB1 based on a voltage of the control node NQ. In an embodiment, the first inversion control circuit 320-1 may include a 16th transistor T16.

The 16th transistor T16 may include a gate electrode connected to the control node NQ, a first electrode configured to receive a third low gate voltage VGL3, and a second electrode connected to the first inversion control node NQB1. The 16th transistor T16 may apply the third low gate voltage VGL3 to the first inversion control node NQB1 in response to the voltage of the control node NQ which has an active level. In an embodiment, the 16th transistor T16 may further include a back gate electrode connected to the control node NQ.

The second inversion control circuit 320-2 may control a voltage of a second inversion control node NQB2 based on the voltage of the control node NQ. In an embodiment, the second inversion control circuit 320-2 may include a 20th transistor T20.

The 20th transistor T20 may include a gate electrode connected to the control node NQ, a first electrode configured to receive the third low gate voltage VGL3, and a second electrode connected to the second inversion control node NQB2. The 20th transistor T20 may apply the third low gate voltage VGL3 to the second inversion control node NQB2 in response to the voltage of the control node NQ which has an active level. In an embodiment, the 20th transistor T20 may further include a back gate electrode connected to the control node NQ.

The gate output circuit 330 may output a gate clock signal G_CLK as the gate signal GS in response to the voltage of the control node NQ which has an active level, and output a first low gate voltage VGL1 or a second low gate voltage VGL2 as the gate signal GS in response to the voltage of the first inversion control node NQB1 which has an active level or the voltage of the second inversion control node NQB2 which has an active level. In an embodiment, the gate output circuit 330 may include a 10th transistor T10, an 11th transistor T1, and a 12th transistor T12.

The 10th transistor T10 may include a gate electrode connected to the control node NQ, a first electrode configured to receive the gate clock signal G_CLK, and a second electrode connected to a gate output node NG through which the gate signal GS is output. The 10th transistor T10 may apply the gate clock signal G_CLK to the gate output node NG in response to the voltage of the control node NQ which has an active level. In an embodiment, the 10th transistor T10 may further include a back gate electrode connected to the control node NQ.

The 11th transistor T11 may include a gate electrode connected to the first inversion control node NQB1, a first electrode configured to receive the first low gate voltage VGL1, and a second electrode connected to the gate output node NG. The 11th transistor T11 may apply the first low gate voltage VGL1 to the gate output node NG in response to the voltage of the first inversion control node NQB1 which has an active level. In an embodiment, the 11th transistor T11 may further include a back gate electrode connected to the first inversion control node NQB1.

The 12th transistor T12 may include a gate electrode connected to the second inversion control node NQB2, a first electrode configured to receive the second low gate voltage VGL2, and a second electrode connected to the gate output node NG. The 12th transistor T12 may apply the second low gate voltage VGL2 to the gate output node NG in response to the voltage of the second inversion control node NQB2 which has an active level. In an embodiment, the 12th transistor T12 may further include a back gate electrode connected to the second inversion control node NQB2.

The carry output circuit 340 may output a second carry clock signal CR_CLK2 as a carry signal CR in response to the voltage of the control node NQ which has an active level, and output the voltage of the control node NQ and the third low gate voltage VGL3 as the carry signal CR in response to the voltage of the first inversion control node NQB1 which has an active level or the voltage of the second inversion control node NQB2 which has an active level. In an embodiment, the carry output circuit 340 may include a fourth transistor T4, a fifth transistor T5, a sixth transistor T6, a seventh transistor T7, an eighth transistor T8, a ninth transistor T9, and a first capacitor C1.

The fourth transistor T4 may include a gate electrode connected to the second carry clock signal CR_CLK2, a first electrode connected to the control node NQ, and a second electrode. The fifth transistor T5 may include a gate electrode connected to the first inversion control node NQB1, a first electrode connected to the second electrode of the fourth transistor T4, and a second electrode connected to a carry output node NCR through which the carry signal CR is output. The sixth transistor T6 may include a gate electrode connected to the second inversion control node NQB2, a first electrode connected to the second electrode of the fourth transistor T4, and a second electrode connected to the carry output node NCR.

When the fourth transistor T4 is turned on in response to the second carry clock signal CR_CLK2 which has an active level and the fifth transistor T5 is turned on in response to the voltage of the first inversion control node NQB1 which has an active level, the fourth transistor T4 and the fifth transistor T5 may apply the voltage of the control node NQ to the carry output node NCR.

When the fourth transistor T4 is turned on in response to the second carry clock signal CR_CLK2 which has an active level, and the sixth transistor T6 is turned on in response to the voltage of the second inversion control node NQB2 which has an active level, the fourth transistor T4 and the sixth transistor T6 may apply the voltage of the control node NQ to the carry output node NCR.

The seventh transistor T7 may include a gate electrode connected to the control node NQ, a first electrode configured to receive the second carry clock signal CR_CLK2, and a second electrode connected to the carry output node NCR. The seventh transistor T7 may apply the second carry clock signal CR_CLK2 to the carry output node NCR in response to the voltage of the control node NQ which has an active level. In an embodiment, the seventh transistor T7 may further include a back gate electrode connected to the control node NQ.

The eighth transistor T8 may include a gate electrode connected to the first inversion control node NQB1, a first electrode configured to receive the third low gate voltage VGL3, and a second electrode connected to the carry output node NCR. The eighth transistor T8 may apply the third low gate voltage VGL3 to the carry output node NCR in response to the voltage of the first inversion control node NQB1 which has an active level. In an embodiment, the eighth transistor T8 may further include a back gate electrode configured to receive the third low gate voltage VGL3.

The ninth transistor T9 may include a gate electrode connected to the second inversion control node NQB2, a first electrode configured to receive the third low gate voltage VGL3, and a second electrode connected to the carry output node NCR. The ninth transistor T9 may apply the third low gate voltage VGL3 to the carry output node NCR in response to the voltage of the second inversion control node NQB2 which has an active level. In an embodiment, the ninth transistor T9 may further include a back gate electrode configured to receive the third low gate voltage VGL3.

The first capacitor C1 may include a first electrode connected to the control node NQ, and a second electrode connected to the carry output node NCR. The first capacitor C1 may reduce distortion of a waveform of the carry signal CR.

The writing selection circuit 350-1 may apply a writing selection signal SS_WR to the first inversion control node NQB1 based on the writing selection signal SS_WR in the writing period WR. For example, the writing selection circuit 350-1 may activate the eighth transistor T8 and the 11th transistor T11 based on the writing selection signal SS_WR which has an active level. In an embodiment, the writing selection circuit 350-1 may include a 13th transistor T13_1 and T13_2, a 14th transistor T14, a 15th transistor T15, and a second capacitor C2.

The 13th transistor T13_1 and T13_2 may include a gate electrode configured to receive the writing selection signal SS_WR, a first electrode configured to receive the writing selection signal SS_WR, and a second electrode. In an embodiment, the 13th transistor T13_1 and T13_2 may include a 13th-first transistor T13_1 and a 13th-second transistor T13_2 which are connected in series and have gate electrodes connected to each other. The 14th transistor T14 may include a gate electrode connected to the second electrode of the 13th transistor T13_1 and T13_2, a first electrode configured to receive the writing selection signal SS_WR, and a second electrode. The 15th transistor T15 may include a gate electrode connected to the control node NQ, a first electrode configured to receive the first low gate voltage VGL1, and a second electrode connected to the gate electrode of the 14th transistor T14. The second capacitor C2 may include a first electrode connected to the gate electrode of the 14th transistor T14 and a second electrode connected to the first inversion control node NQB1. The second capacitor C2 may speed up turn-on and turn-off of the 14th transistor T14.

The holding selection circuit 350-2 may apply a holding selection signal SS_HL to the second inversion control node NQB2 based on the holding selection signal SS_HL in the holding period HL. For example, the holding selection circuit 350-2 may activate the ninth transistor T9 and the 12th transistor T12 based on the holding selection signal SS_HL which has an active level. In an embodiment, the holding selection circuit 350-2 may include a 17th transistor T17_1 and T17_2, an 18th transistor T18, a 19th transistor T19, and a third capacitor C3.

The 17th transistor T17_1 and T17_2 may include a gate electrode configured to receive the holding selection signal SS_HL, a first electrode configured to receive the holding selection signal SS_HL, and a second electrode. In an embodiment, the 17th transistor T17_1 and T17_2 may include a 17th-first transistor T17_1 and a 17th-second transistor T17_2 which are connected in series and have gate electrodes connected to each other. The 18th transistor T18 may include a gate electrode connected to the second electrode of the 17th transistor T17_1 and T17_2, a first electrode configured to receive the holding selection signal SS_HL, and a second electrode. The 19th transistor T19 may include a gate electrode connected to the control node NQ, a first electrode configured to receive the second low gate voltage VGL2, and a second electrode connected to the gate electrode of the 18th transistor T18. The third capacitor C3 may include a first electrode connected to the gate electrode of the 18th transistor T18 and a second electrode connected to the second inversion control node NQB2. The third capacitor C3 may speed up turn-on and turn-off of the 18th transistor T18.

The writing selection signal SS_WR and the holding selection signal SS_HL may have mutually different phases (e.g., opposite phases). Each of the writing selection signal SS_WR and the holding selection signal SS_HL may have alternating high and low level voltages. In an embodiment, in a first frame period, the writing selection signal SS_WR and the holding selection signal SS_HL may have the high level voltage and the low level voltage, respectively, so that the eighth transistor T8 and the 11th transistor T11 may be turned-on. In addition, in a second frame period after the first frame period, the writing selection signal SS_WR and the holding selection signal SS_HL may have the low level voltage and the high level voltage, respectively, so that the ninth transistor T9 and the 12th transistor T12 may be turned-on.

In an embodiment, each of the stages 300 may further include a second transistor T2_1 and T2_2. The second transistor T2_1 and T2_2 may include a gate electrode configured to receive a global control signal ESR, a first electrode configured to receive the first low gate voltage VGL1, and a second electrode connected to the control node NQ. The second transistor T2_1 and T2_2 may apply the first low gate voltage VGL1 to the control node NQ in response to the global control signal ESR which has an active level. In an embodiment, the second transistor T2_1 and T2_2 may include a second-first transistor T2_1 and a second-second transistor T2_2 which are connected in series and have gate electrodes connected to each other.

In an embodiment, the global control signal ESR may be substantially simultaneously applied to the stages when the display device is powered on. The second transistors T2_1 and T2_2 of the stages may substantially simultaneously reset the control nodes NQ of the stages to the first low gate voltage VGL1 in response to the global control signal ESR.

In an embodiment, each of the stages 300 may further include a third transistor T3_1 and T3_2. The third transistor T3_1 and T32 may include a gate electrode connected to the control node NQ, a first electrode configured to receive a high gate voltage VGH, and a second electrode connected to a middle node of the first transistor T1_1 and T1_2 and a middle node of the second transistor T2_1 and T2_2. The third transistor T3_1 and T3_2 may apply the high gate voltage VGH to the middle node of the first transistor T1_1 and T1_2 and the middle node of the second transistor T2_1 and T2_2 in response to the voltage of the control node NQ which has an active level. In an embodiment, the third transistor T3_1 and T32 may include a third-first transistor T3_1 and a third-second transistor T3_2 which are connected in series and have gate electrodes connected to each other.

In an embodiment, all the transistors T1_1, T1_2, T2_1, T2_2, T3_1, T3_2, T4, T5, T6, T7, T8, T9, T10, T11, T12, T13_1, T13_2, T14, T15, T16, T17_1, T17_2, T18, T19, and T20 included in each of the stages 300 may be N-type transistors (e.g., NMOS transistors) or oxide transistors. However, all the transistors T1_1, T1_2, T2_1, T2_2, T3_1, T3_2, T4, T5, T6, T7, T8, T9, T10, T11, T12, T13_1, T13_2, T14, T15, T16, T17_1, T17_2, T18, T19, and T20 included in each of the stages 300 may be P-type transistors (e.g., PMOS transistors). Moreover, some of the transistors T1_1, T1_2, T2_1, T2_2, T3_1, T3_2, T4, T5, T6, T7, T8, T9, T10, T11, T12, T13_1, T13_2, T14, T15, T16, T17_1, T17_2, T18, T19, and T20 included in each of the stages 300 may be implemented as a N-type transistors (e.g., NMOS transistors) or oxide transistors, and others of the transistors T1_1, T1_2, T2_1, T2_2, T3_1, T3_2, T4, T5, T6, T7, T8, T9, T10, T11, T12, T13_1, T13_2, T14, T15, T16, T17_1, T17_2, T18, T19, and T20 included in each of the stages 300 may be implemented as a P-type transistors (e.g., PMOS transistors).

Each of the stages 300 may receive the input signal FLM/PCR, the high gate voltage VGH, the first low gate voltage VGL1, the second low gate voltage VGL2, the third low gate voltage VGL3, the first carry clock signal CR_CLK1, and the second carry clock signal CR_CLK2. The high gate voltage VGH may be higher than each of the first low gate voltage VGL1, the second low gate voltage VGL2, and the third low gate voltage VGL3, and the third low gate voltage VGL3 may be lower than each of the first low gate voltage VGL1 and the second low gate voltage VGL2.

In an embodiment, the first low gate voltage VGL1 may be higher than the second low gate voltage VGL2 and, according to another embodiment, the first low gate voltage VGL1 may be lower than the second low gate voltage VGL2.

As described above, the gate driver 130 may output mutually different low gate voltages in the writing period WR and the holding period HL. Accordingly, the luminance deviation of the display panel 110 may be reduced in the writing period WR and the holding period HL.

Figure 10:
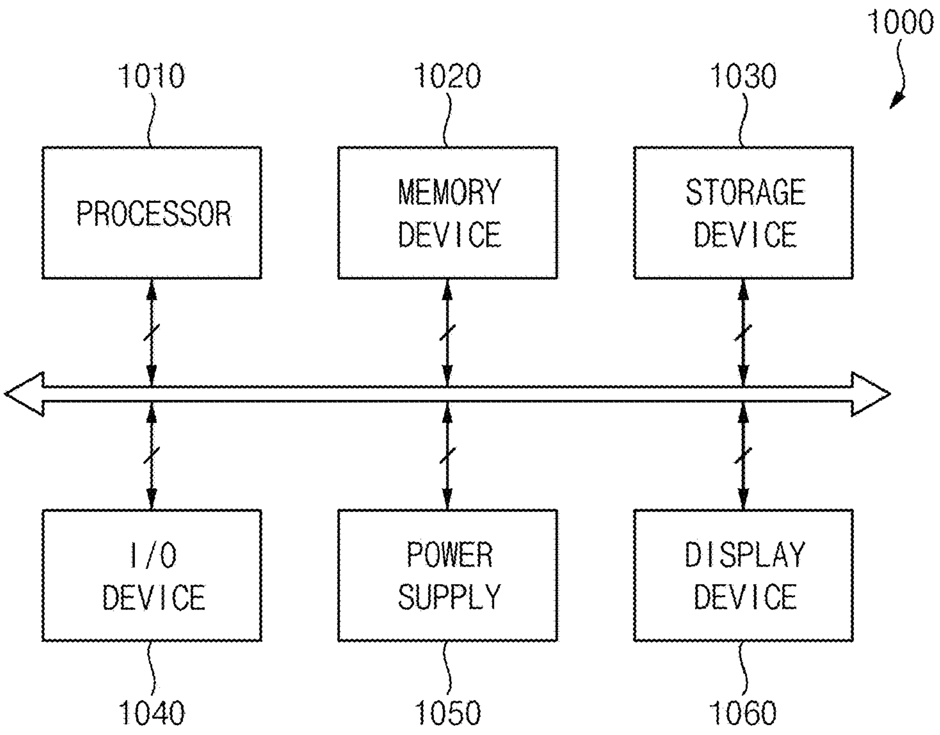
FIG. 10 is a block diagram illustrating an electronic device.
Figure 11:
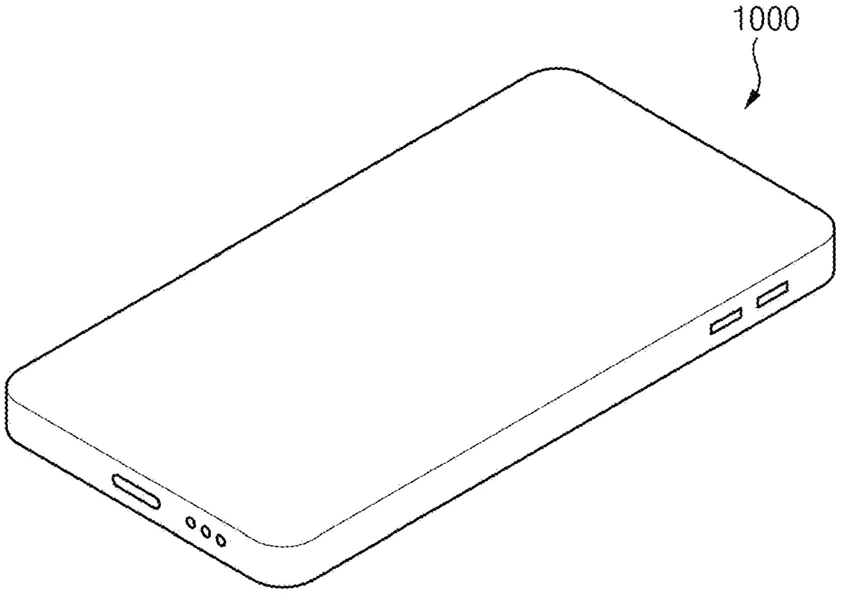
FIG. 11 is a diagram illustrating an embodiment in which the electronic device of FIG. 10 is implemented as a smart phone.

FIG. 10 is a block diagram illustrating an electronic device. FIG. 11 is a diagram illustrating an embodiment in which the electronic device of FIG. 10 is implemented as a smart phone.

Referring to FIGS. 10 and 11, the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic device, and the like.

In an embodiment, as illustrated in FIG. 11, the electronic device 1000 may be implemented as the smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro-processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventive concepts may be applied to any display device and any electronic device including the touch panel. For example, the inventive concepts may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A gate driver comprising:

a plurality of stages, wherein each of the stages includes:

a writing selection circuit which applies a writing selection signal to a first inversion control node based on the writing selection signal in a writing period;

a holding selection circuit which applies a holding selection signal to a second inversion control node based on the holding selection signal in a holding period; and a gate output circuit which outputs a gate signal including a high gate voltage and a low gate voltage to a gate line, the gate output circuit outputting a first low gate voltage as the low gate voltage to the gate line in response to a voltage of the first inversion control node in the writing period, and outputting a second low gate voltage that is different from the first low gate voltage as the low gate voltage to the gate line in response to a voltage of the second inversion control node in the holding period.

2. The gate driver of claim 1, wherein each of the writing selection signal and the holding selection signal has alternating high and low level voltages.

3. The gate driver of claim 2, wherein, in the writing period, the writing selection signal has the high level voltage and the holding selection signal has the low level voltage, and, in the holding period, the writing selection signal has the low level voltage and the holding selection signal has the high level voltage.

4. The gate driver of claim 1, wherein the second low gate voltage is lower than the first low gate voltage.

5. The gate driver of claim 1, wherein all transistors included in each of the stages are N-type transistors.

6. The gate driver of claim 1, wherein the gate output circuit includes:

a ninth transistor including a gate electrode electrically connected to a control node, a first electrode, and a second electrode connected to a gate output node through which a gate signal is output;

a 10th transistor including a gate electrode connected to the first inversion control node, a first electrode configured to receive the first low gate voltage, and a second electrode connected to the gate output node;

an 11th transistor including a gate electrode connected to the second inversion control node, a first electrode configured to receive the second low gate voltage, and a second electrode connected to the gate output node; and a second capacitor including a first electrode electrically connected to the control node and a second electrode connected to the gate output node.

7. The gate driver of claim 6, wherein the writing selection circuit includes:

a 12th transistor including a gate electrode configured to receive the writing selection signal, a first electrode configured to receive the writing selection signal, and a second electrode;

a 13th transistor including a gate electrode connected to the second electrode of the 12th transistor, a first electrode configured to receive the writing selection signal, and a second electrode;

a 14th transistor including a gate electrode configured to receive a second gate clock signal, a first electrode connected to the second electrode of the 13th transistor, and a second electrode connected to the first inversion control node;

a 15th transistor including a gate electrode connected to the control node, a first electrode configured to receive the first low gate voltage, and a second electrode connected to the gate electrode of the 13th transistor; and a third capacitor including a first electrode connected to the gate electrode of the 13th transistor and a second electrode connected to the first inversion control node, and wherein the holding selection circuit includes:

a 17th transistor including a gate electrode configured to receive the holding selection signal, a first electrode configured to receive the holding selection signal, and a second electrode;

an 18th transistor including a gate electrode connected to the second electrode of the 17th transistor, a first electrode configured to receive the holding selection signal, and a second electrode;

a 19th transistor including a gate electrode configured to receive the second gate clock signal, a first electrode connected to the second electrode of the 18th transistor, and a second electrode connected to the second inversion control node;

a 20th transistor including a gate electrode connected to the control node, a first electrode configured to receive the second low gate voltage, and a second electrode connected to the gate electrode of the 18th transistor; and a fourth capacitor including a first electrode connected to the gate electrode of the 18th transistor and a second electrode connected to the second inversion control node.

8. The gate driver of claim 6, wherein each of the stages further includes:

an input circuit configured to apply an input signal to the control node; and a carry output circuit configured to output a third low gate voltage that is different from the first low gate voltage and the second low gate voltage as a carry signal in response to the voltage of the first inversion control node or the voltage of the second inversion control node, wherein the input circuit includes:

a first transistor including a gate electrode configured to receive a first gate clock signal, a first electrode configured to receive the input signal, and a second electrode connected to the control node, and wherein the carry output circuit includes:

a sixth transistor including a gate electrode electrically connected to the control node, a first electrode, and a second electrode connected to a carry output node through which the carry signal is output;

a seventh transistor including a gate electrode connected to the first inversion control node, a first electrode configured to receive the third low gate voltage, and a second electrode connected to the carry output node; and an eighth transistor including a gate electrode connected to the second inversion control node, a first electrode configured to receive the third low gate voltage, and a second electrode connected to the carry output node.

9. The gate driver of claim 8, wherein the third low gate voltage is lower than each of the first low gate voltage and the second low gate voltage.

10. The gate driver of claim 6, wherein each of the stages further includes:

a first inversion control circuit configured to control the voltage of the first inversion control node based on a voltage of the control node;

a second inversion control circuit configured to control the voltage of the second inversion control node based on the voltage of the control node; and a control circuit configured to control the voltage of the control node based on the voltage of the first inversion control node or the voltage of the second inversion control node, wherein the first inversion control circuit includes:

a 16th transistor including a gate electrode connected to the control node, a first electrode configured to receive a third low gate voltage, and a second electrode connected to the first inversion control node, wherein the second inversion control circuit includes:

a 21st transistor including a gate electrode connected to the control node, a first electrode configured to receive the third low gate voltage, and a second electrode connected to the second inversion control node, and wherein the control circuit includes:

a second transistor including a gate electrode connected to the second inversion control node, a first electrode configured to receive the third low gate voltage, and a second electrode connected to the control node; and a third transistor including a gate electrode connected to the first inversion control node, a first electrode configured to receive the third low gate voltage, and a second electrode connected to the control node.

11. The gate driver of claim 6, wherein each of the stages further includes:

a boosting circuit configured to boost a voltage of the control node, and wherein the boosting circuit includes:

a fifth transistor including a gate electrode electrically connected to the control node, a first electrode configured to receive a second gate clock signal, and a second electrode; and a first capacitor including a first electrode electrically connected to the control node and a second electrode connected to the second electrode of the fifth transistor.

12. A display device comprising:

a display panel including a plurality of pixels; and a gate driver which applies a gate signal to the display panel, wherein the gate driver includes a plurality of stages, and each of the stages includes:

a writing selection circuit which applies a writing selection signal to a first inversion control node based on the writing selection signal in a writing period;

a holding selection circuit which applies a holding selection signal to a second inversion control node based on the holding selection signal in a holding period; and a gate output circuit which outputs a gate signal including a high gate voltage and a low gate voltage to a gate line, the gate output circuit outputting a first low gate voltage as the low gate voltage to the gate line in response to a voltage of the first inversion control node in the writing period, and outputting a second low gate voltage that is different from the first low gate voltage as the low gate voltage to the gate line in response to a voltage of the second inversion control node in the holding period.

13. The display device of claim 12, wherein each of the writing selection signal and the holding selection signal has alternating high and low level voltages.

14. The display device of claim 13, wherein, in the writing period, the writing selection signal has the high level voltage and the holding selection signal has the low level voltage, and, in the holding period, the writing selection signal has the low level voltage and the holding selection signal has the high level voltage.

15. The display device of claim 12, wherein the second low gate voltage is lower than the first low gate voltage.

16. The display device of claim 12, wherein all transistors included in each of the stages are N-type transistors.

17. The display device of claim 12, wherein the gate output circuit includes:

a ninth transistor including a gate electrode electrically connected to a control node, a first electrode, and a second electrode connected to a gate output node through which the gate signal is output;

a 10th transistor including a gate electrode connected to the first inversion control node, a first electrode configured to receive the first low gate voltage, and a second electrode connected to the gate output node;

an 11th transistor including a gate electrode connected to the second inversion control node, a first electrode configured to receive the second low gate voltage, and a second electrode connected to the gate output node; and a second capacitor including a first electrode electrically connected to the control node and a second electrode connected to the gate output node.

18. The display device of claim 17, wherein the writing selection circuit includes:

a 12th transistor including a gate electrode configured to receive the writing selection signal, a first electrode configured to receive the writing selection signal, and a second electrode;

a 13th transistor including a gate electrode connected to the second electrode of the 12th transistor, a first electrode configured to receive the writing selection signal, and a second electrode;

a 14th transistor including a gate electrode configured to receive a second gate clock signal, a first electrode connected to the second electrode of the 13th transistor, and a second electrode connected to the first inversion control node;

a 15th transistor including a gate electrode connected to the control node, a first electrode configured to receive the first low gate voltage, and a second electrode connected to the gate electrode of the 13th transistor; and a third capacitor including a first electrode connected to the gate electrode of the 13th transistor and a second electrode connected to the first inversion control node, and wherein the holding selection circuit includes:

a 17th transistor including a gate electrode configured to receive the holding selection signal, a first electrode configured to receive the holding selection signal, and a second electrode;

an 18th transistor including a gate electrode connected to the second electrode of the 17th transistor, a first electrode configured to receive the holding selection signal, and a second electrode;

a 19th transistor including a gate electrode configured to receive the second gate clock signal, a first electrode connected to the second electrode of the 18th transistor, and a second electrode connected to the second inversion control node;

a 20th transistor including a gate electrode connected to the control node, a first electrode configured to receive the second low gate voltage, and a second electrode connected to the gate electrode of the 18th transistor; and a fourth capacitor including a first electrode connected to the gate electrode of the 18th transistor and a second electrode connected to the second inversion control node.

19. The display device of claim 17, wherein each of the stages further includes:

an input circuit configured to apply an input signal to the control node; and a carry output circuit configured to output a third low gate voltage that is different from the first low gate voltage and the second low gate voltage as a carry signal in response to the voltage of the first inversion control node or the voltage of the second inversion control node, wherein the input circuit includes:

a first transistor including a gate electrode configured to receive a first gate clock signal, a first electrode configured to receive the input signal, and a second electrode connected to the control node, and wherein the carry output circuit includes:

a sixth transistor including a gate electrode electrically connected to the control node, a first electrode, and a second electrode connected to a carry output node through which the carry signal is output;

a seventh transistor including a gate electrode connected to the first inversion control node, a first electrode configured to receive the third low gate voltage, and a second electrode connected to the carry output node; and an eighth transistor including a gate electrode connected to the second inversion control node, a first electrode configured to receive the third low gate voltage, and a second electrode connected to the carry output node.

20. The display device of claim 19, wherein the third low gate voltage is lower than each of the first low gate voltage and the second low gate voltage.

* * * * *